United States Patent Office 2,976,032
Patented Mar. 21, 1961

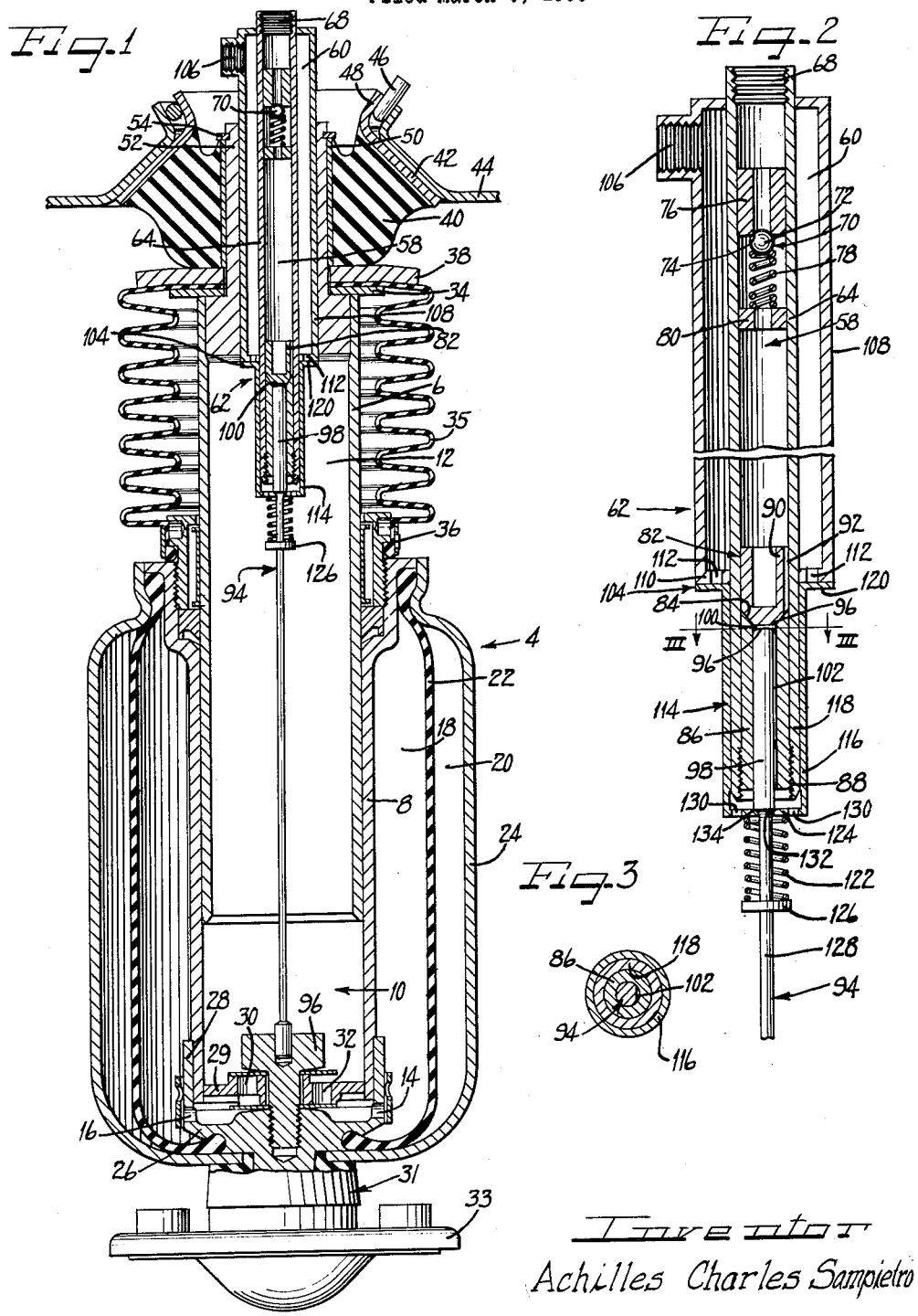

2,976,032

HYDRO-PNEUMATIC SUSPENSION STRUT

Achilles C. Sampietro, Detroit, Mich., assignor to Thompson Ramo Wooldridge Inc., a corporation of Ohio Filed Mar. 6, 1958, Ser. No. 719,633

6 Claims. (Cl. 267—64)

The present invention relates to improvements in suspension struts for vehicles, and more particularly to a hydro-pneumatic type of suspension strut supplied with a pressurized fluid for controlling the length of the strut and having a fluid flow system of the non-leakdown type provided with an improved control valve.

Suspension struts of the type referred to are utilized as air springs for vehicles such as automobiles. In addition to providing a resilient support, the struts are used to maintain the vehicle level. For this purpose, an individual strut is usually connected at each corner of the vehicle between the axle and frame. In a hydro-pnuematic strut, an air chamber is utilized to provide resilient spring suspension, and the air chamber may be exposed to a fluid chamber, wherein the quantity of fluid is varied to maintain the frame at a constant level above the vehicle regardless of changes in frame loading. The supply of fluid to the chamber is critical to satisfactory operation of the strut, and this flow is controlled by a valve. Pressurized fluid is supplied from a pressure pump communicating with each of the struts. A feature of the present invention is the provision of an improved non-leakdown type of flow system for a hydropneumatic strut wherein fluid is released from the strut chamber only when the strut extends beyond a predetermined length, due to reduction in load on the vehicle frame, and fluid is supplied to the chamber when the strut compresses beyond a predetermined minimum length due to increase in loading on the frame. Another feature of the invention is the provision of a valve in a strut employing a non-leakdown principle which is positioned within the strut chamber so as to avoid the necessity of providing an exposed valve with unnecessary extra connections and conduits.

A further feature is to provide a suitable valve which is capable of continued satisfactory operation without damage from violent shocks and movements incurred by the system from road bumps at high speeds, and which will have a long operating life so as to be able to withstand the demands of operation with the frequent and many openings and closing of the valve such as are required over years of use with a vehicle.

Accordingly, an object of the invention is to provide an improved fluid flow control system for a leveling strut of the non-leakdown type wherein both positive control of fluid flow into the strut and positive fluid flow from the strut are obtained.

Another object of the invention is to provide an improved combination valve assembly which is located within the pressure chamber of a leveling strut which controls both the flow of fluid into the chamber and the flow of fluid from the chamber.

Another object of the invention is to provide an improved control valve in a non-leakdown automatic leveling strut for a vehicle which employs a single operating member within the strut chamber for a valve assembly having valve means which control the fluid flow both into and out of the chamber.

Another object of the invention is to provide an improved valve for a resilient support strut which can withstand the rapid and violent movements of the parts and the pressure shocks which occur during operation of the vehicle.

A further object is to provide an improved valve which employs a minimum number of parts, is simple to manufacture and assemble and is simple in operation, and which is well suited to use in an environment having the rigid operating requirements of a vehicle supporting and leveling strut.

Other objects and advantages will become more apparent with the teaching of the features and principles of the invention in connection with the disclosure of the preferred embodiments in the specification, drawings, and claims, in which:

Figure 1 is a vertical sectional view of a vehicle supporting and leveling strut embodying the features of the present invention;

Figure 2 is an enlarged detailed sectional view of the flow control system for the strut and especially the flow control valve; and Figure 3 is a sectional view taken along line III—III of Figure 2.

As illustrated in Figure 1, a strut 4 is provided which is adapted for connection between the axle and the frame of a vehicle to be resiliently supported. The strut is expansible in length and includes a piston 6, which is slidably received within a cylinder 8. The piston 6 provides one end of the strut and the cylinder 8, the other end, and between them they define a fluid chamber 10. The amount of fluid within the chamber 10 determines the extended length of the strut 4, and thus the height of the frame above the axle.

More specifically, the piston 6 is in the form of a hollow tubular member, and the interior 12 of the piston forms a part of the fluid strut chamber 10. The cylinder 8 is tubular in construction, and fluid flows through lateral openings 14 and 16 at the bottom of the cylinder into a chamber 18, which extends annularly around the outside of the cylinder. This fluid chamber 18 is in operative contact with an air chamber 20, with the fluid chamber 18 being separated from the air chamber by a flexible annular bladder 22.

The air chamber 20 is enclosed by a hollow metal shell 24, which meets the upper and lower ends of the cylinder 8 to clamp the ends of the air bladder therebetween to isolate the air chamber 20 from the fluid chamber 18. Thus, the resiliency of the air within the chamber 20 provides the resilient support for the strut, and as the vehicle moves, the strut will resiliently support the frame by movement of the piston 6 up and down within the cylinder 8. The relatively incompressible fluid within the chambers 12 and 18 transmits the force of the moving piston to the air chamber 20 for resilient operation of the strut.

The lower end of the cylinder 8 is secured to a casting 26, having an annular extending flange 28 for telescopically receiving the cylinder, and the cylinder is secured within the casting 26. The lateral holes 14 and 16 for flow of fluid between the cylinder interior and the chamber 18 are drilled radially through the casting 26. A circular plate 29 is positioned within the cylinder and has flow holes 30 and 32 therethrough for the flow of fluid between the chambers 12 and 18, as the air within the chamber 20 compresses or expands. At the bottom of the cylinder is a ball and socket joint 31, having an outwardly extending flange 33 provided with means for connecting to the axle of the vehicle. Thus, the lower portion of the strut, including the cylinder 8, the casting 26, the bladder 22, and the air chamber shell 24 remains stationary relative to the axle of the vehicle, and has movement relative to the upper portion of the strut. The upper end of the strut includes the piston 6 and its related elements.

At the top of the piston 6 is an annular ring 34 over which extends the top end of a tubular accordion bellows 35. The lower end of the bellows is clamped, such as by a circular band 36, to the top end of the cylinder and the bellows protects the outer surface of the piston 6 from dirt and dust.

An annular washer 38 clamps the bellows to the upper surface of the ring 34. The annular washer supports a rubber collar 40. At the top of the rubber collar 40 is a frusto-conical shaped metal ring 42 upon which a portion 44 of the frame of the vehicle rests. The frame portion 44 is clamped against the collar 42 by a snap ring 46, which seats between the frame and an outwardly turned upper end 48 of the metal ring 42.

At the inner surface of the rubber collar 40 is a metal sleeve 50, through which passes a generally cylindrically shaped casting 52. The casting has an annular groove to receive a snap ring 54 to hold the rubber collar 40 and its inner sleeve 50 in place on the top of the piston 6. Thus, the foregoing assembly forms the upper end of the strut 4.

As the load on the frame of the vehicle is increased, the strut will tend to compress by the piston 6 sliding downwardly within the cylinder 8. As the load is decreased, the piston will tend to move upwardly, inasmuch as the air within the chamber 20 will tend to expand. To maintain the strut at a constant length, and to thereby maintain the frame of the vehicle at a constant level above the axle, a supply of fluid is delivered to the chamber 12 to increase the length of the strut, or fluid is discharged from the chamber 12 to decrease its length.

The fluid control system for controlling the amount of fluid within the chamber 12, and thereby the length of the strut, includes an inlet passage 58, leading into the chamber 12 within the strut, and a discharge passage 60 leading from the chamber. Flow through these passages is controlled by a valve assembly 62.

The valve assembly is shown combined with the strut in Figure 1, and is shown in enlarged detail in Figure 2. The inlet passage 58 is formed by an elongated inlet tube 64 which extends axially down through the center of the casting 52, which is secured at the top of the cylinder 6. The upper end of the tube 64 has a head 68 provided with internal threads for connecting a fluid conduit which is supplied with pressurized fluid from a supply pump. A flow return ball check valve 70 may be provided upstream in the inlet passage 58 to prevent the return of fluid through the passage to the conduit connected to the head 68 which leads back to the pump. The supply pump may be connected through a fluid circuit to other struts at the corners of the vehicle, and the check valve 70 effectively prevents a pressure surge of fluid to the other struts, which would have an adverse effect on their operation. Such a surge of fluid can occur when the vehicle encounters a sharp or sudden road bump.

The ball check valve 70 includes a ball 72 which is held against an annular seat 74 on an annularly shaped insert 76 within the inlet passage 58. A token spring 78 holds the ball check in place and bottoms on an annular ring 80 within the inlet passage 58 to form a shoulder for supporting the spring.

The flow of fluid into the chamber 6 through the inlet passage 58 is controlled by an inlet control valve 82. The inlet control valve 82 is located within the strut chamber 12 thereby eliminating the need for special lines or conduits to provide a connection to the valve and the valve is protected within the strut.

The inlet valve includes an annular valve seat 84 which is formed at the top of a sleeve insert 86, fitted up within the end of the inlet tube 64. To receive the sleeve in fixed relation to the tube, mating threads 88 are provided between the outer surface of the sleeve 86 and the lower end of the tube 64.

A valve element 90 rests against the valve seat 84 to prevent the flow of fluid past the valve 82 into the chamber 12. The valve element 90 is substantially cylindrical in shape, being provided with a hollow interior to decrease its weight and has a tapered lower face to coact with the valve seat 84. To permit flow past the valve element 90, which is slidingly guided by the inner surface of the tube 64 in its movement toward or from the valve seat 84, a flow channel or groove 92 is formed axially along one side of the valve element 90. It will be understood that the valve element 90 could take various other forms, such as a ball or other valve member which would suitably close against the valve seat 84.

To dislodge the valve element 90 from the seat 84 and permit the flow of fluid, a control needle 94 projects upwardly with its upper tip 96 engaging the valve element 90 and pushing it off the seat when the control needle 94 moves upwardly. The control needle 94 has an enlarged upper end 98 which is of a size to freely slide within the sleeve 86 within the inlet tube, but to prevent the control needle from vibrating laterally to cause noise and wear and to prevent the free escape of fluid past the needle.

The control needle 94, as may be seen in Figure 1, is connected at its bottom end to a stud 96 which threads into the casting 26. Thus, the control needle is connected to the lower end of the strut 4 and is stationary relative to the lower end of the strut to move up and down with the lower end as the strut compresses or expands with up and down movement relative to the upper end of the strut. Thus, as the frame of the vehicle is loaded, the upper end of the strut will settle down on the lower end, and the control needle 94 will push the valve element 90 off the seat, permitting the flow of pressurized fluid into the chamber 12 to restore the strut to its original length. As the strut expands, the control needle will move relatively downwardly to permit the valve element 90 to again seat. The valve element is held against the seat by the pressure differential between the fluid supply pressure upstream in the inlet passage 58 and the pressure within the chamber 12.

On rough roads, the strut may be caused to rapidly compress and expand with the control needle 94 moving rapidly up and down within the sleeve 86. The upper end 96 of the control needle is prevented from hammering the valve element by virtue of a trapped cushion of fluid within an operator chamber 100 defined within the sleeve 86 and between the upper end 96 of the control needle and the lower end of the valve element 90. The upper enlarged end 98 of the control needle 94 is provided with one or more flat surfaces, as shown at 102, in the cylindrical surface of the end 98. These flat surfaces provide flow paths for the normal flow of fluid to flow past the large end 98 of the flow control needle. However, the flow paths are of a size so that the cross-sectional flow area for the escape of fluid from the chamber 100 is retarded sufficiently to maintain a cushion of fluid within the chamber when the control needle moves upwardly very rapidly.

The release or discharge of fluid from the chamber 12 through the discharge passage 60 is controlled by a discharge valve 104. The discharge valve 104 is positioned to control the release of fluid from the chamber 12 up through the passage 60 and the upper end of the passage leads out through a fitting 106 which is threaded for the connection of a conduit leading back to a fluid supply sump or the like.

The discharge conduit 60 is shown in the form of a tube 108 which is larger than the inlet tube 64, and which is coaxial therewith to surround the inlet tube and form the discharge passage 60 in the shape of an annular chamber. In some instances, it may be desirable to provide a flow return check valve in the discharge passage 60, such as near the end of the fitting 106, to prevent the fluid from backing up into the chamber 12 from the lines leading to a sump, although this check valve is not shown.

The discharge valve 104 leading to the discharge passage 60, includes an annular end wall 110 which extends across the end of the discharge tube 108, and has flow orifices 112 therethrough. The annular wall is welded or brazed to the end of the discharge tube 108, and to the inlet tube 64 which extends downwardly to project beyond the end of the discharge tube.

The discharge valve 104 includes a valve element 114. The valve element has a collar 116 which encircles the lower end 118 of the inlet tube in order that the lower end of the inlet tube provide sliding support to the discharge valve element 114. At its upper end, the collar 116 is provided with an annular flange 120 having an upper flat surface which seats against the orifices 112 to close them when the valve element 114 is in closed position. The valve element is held in closed position partly by the pressure differential between the chamber 12 and the discharge passage 60, and also by a coil compression spring 122.

The coil compression spring 122 bears upwardly against an end wall 124 extending across the end of the collar 116. The lower end of the spring 122 rests on a washer 126, secured to the stem portion 128 of the control needle 94.

The end wall 124 of the discharge valve 14 has flow orifices 130 to permit the passage of inlet fluid. The end wall 124 also has a central opening 132, which is sufficiently large to permit free movement of the stem 128 of the control needle 94, but to engage by the shoulder 134 formed at the lower end of the enlarged portion 98 of the control needle.

Thus, when the control needle moves relatively downwardly with respect to the valve assembly 62, the discharge valve 114 is pulled downwardly to open the orifices 112 and permit the release of fluid from the chamber 12. This will shorten the strut, causing it to return to normal position, and the control needle will move back to its neutral position, as shown in Figure 2.

Thus, the control needle serves to control both the inlet valve 82 and the discharge valve 14.

In operation, the strut 4 is connected with its lower end suitably secured to an axle, such as by connecting the ball-socket flange 31 to a portion of the axle. A vehicle frame is supported at the upper end of the strut, such as by the frame portion 44 being connected to the rubber collar 40. The flow of pressurized fluid is supplied to the inlet passage 48. When the strut is shortened by loading of the frame to compress the air within the chamber 20 of the strut, the control needle 94 moves upwardly relative to the inlet valve 82 to lift the valve member 90 off the seat 84. Fluid then flows into the chamber 12 to restore the strut to its normal length. When weight is removed from the frame, the strut will elongate, and the control needle 94 will move downwardly whereupon the shoulder 134 will engage the sides of the opening 132 of the end wall 124 of the discharge valve member 144, pulling the discharge valve member downwardly. This will permit the discharge of fluid from the chamber 12 through the orifices 112 of the discharge valve 104. Thus, the strut is returned to its normal length. Very rapid upward movement of the control needle 94 within the sleeve 86 in the lower end 118 of the inlet tube will trap a cushion of fluid within the chamber 100 at the upper end 96 of the control needle, inasmuch as rapid escape of fluid will be prevented by the limited cross-sectional flow area of the flat areas 102 at the side of the control needle 94.

Thus, it will be seen that I have provided an improved strut for resiliently supporting and automatically leveling vehicles with an improved flow control system which meets the objectives and advantages hereinbefore set forth.

The flow control system and the operating valves obtain a positive control of fluid within the strut and are well suited for use in a non-leakdown type of system. The admission of fluid into the chamber within the strut, or the release of fluid therefrom is positively controlled to retain the strut at a predetermined length. The valve assembly including the inlet and discharge valves are operated by a common control element, obtaining numerous advantages for the system. Further, the valve assembly is formed of a number of elements which are rugged in construction, and operation, and are able to withstand the rigors of operation in a support strut for a vehicle, and are capable of having a long operating life.

While the elements of the invention are shown in the preferred environment, it will be understood that the features may be utilized in other environments, taking advantage of their inherent advantages and objectives.

I have, in the drawings and specification, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. An expansible strut assembly for connection between the axle and frame of a vehicle and for controlling the level of the frame above the axle comprising in combination a supporting strut having a piston with a cylinder slidably receiving the piston and forming a chamber therebetween, the piston being connected to one end of the strut and the cylinder to the other end whereby the amount of fluid in said chamber will control the length of the strut, a tubular inlet passage leading into one end of the strut and communicating with the chamber, a valve in the passage including a valve seat facing the flow of fluid and a movable valve element held against the seat by the pressure of the fluid supplied to the chamber through the inlet passage, a valve control needle positioned downstream of said valve and slidable in said inlet passage to displace the valve element from the seat, said control needle connected to the other end of said strut to move relative to the valve with shortening or lengthening of the strut, a coaxial discharge passage at said one end of the strut surrounding said inlet passage, a discharge valve for said discharge passage including an annular end wall for the discharge passage with flow orifices therethrough and a movable valve element seated against said orifices, said inlet passage having a tubular extension past the inlet valve and said discharge valve element having a collar slidable on said tubular extension to guide the discharge valve element, and means on said control needle for engaging the discharge valve element to open the discharge valve when the control needle moves relatively in a direction away from said inlet and said discharge valves.

2. A control valve for controlling the flow of fluid from an inlet area to an intermediate chamber and from the chamber to a discharge area comprising in combination a tubular inlet conduit leading from an inlet area to an intermediate chamber, a valve seat within the inlet flow conduit facing in an upstream direction, a movable valve element seated against said seat, a control needle slidable within the inlet conduit downstream of the valve element and movable toward the inlet valve to engage the valve element to move it off of the seat to permit a flow of fluid, a tubular discharge conduit larger than the inlet conduit and coaxial therewith terminating short of the end of the inlet conduit, a discharge valve including an annular end wall in the discharge conduit having flow orifices therethrough and a movable discharge valve element, said discharge valve element including an annular surface which seats against the end wall to close said orifices and a collar attached thereto slidably surrounding the inlet conduit and having an end wall spaced from the annular surface with an opening for admitting said control needle, and means on said control needle for engaging the discharge valve element and moving it away from said orifices when the control needle moves away from the inlet valve element.

3. An expansible strut assembly for connection between the axle and frame of a vehicle and for controlling the level of the frame above the axle comprising a strut member for supporting a frame above a vehicle axle having an internal expansible fluid chamber controlling the length of the strut in accordance with the quantity of fluid therein, an inlet passage leading into the strut chamber for delivering pressurized fluid to the chamber to expand the strut, a discharge passage leading from the strut chamber for the release of fluid to reduce the length of the strut, an inlet valve positioned to control flow through said inlet passage and mounted to remain in a fixed position relative to one end of the strut and having a valve seat and a coacting movable valve member on said seat, a discharge valve means positioned to control flow through said discharge passage and having a valve seat and a coacting movable valve member engaging said seat, said valve means fixed in position relative to said one end of the strut, and a valve control member mounted stationary relative to the other end of the strut and positioned to move in a path to engage said inlet movable valve member when the strut ends move together to lift it off its seat and to engage said discharge movable valve member when the strut ends move apart and lift it off its seat whereby the strut will remain at substantially constant length.

4. An expansible strut assembly for connection between the axle and frame of a vehicle for controlling the level of the frame above the axle comprising in combination a supporting strut having a piston member slidably received within a cylinder member with a chamber defined within the cylinder member, an inlet passage leading into said chamber for delivering pressurized fluid to expand the length of the strut, a discharge passage leading from the strut chamber for the discharge of fluid to reduce the length of the strut, an inlet valve within the chamber positioned to control the flow of fluid through the inlet passage and having a valve seat facing upstream in the inlet passage and having a movable valve element positioned on the seat, a discharge valve within the chamber positioned to control the flow of fluid through the discharge passage and having a valve seat facing upstream in the discharge passage with a coacting movable valve element against said seat, said inlet valve and said discharge valve both fixedly mounted to be positively movable with the same one of said piston and cylinder members for both expansion and contraction of the strut, and a valve operator non-yieldingly connected to the other of said piston and cylinder members for both expansion and contraction of the strut and positioned to extend between said inlet valve element and said discharge valve element and engaging said inlet valve element to lift it from its seat as the piston moves into the cylinder whereby fluid will be fed into the chamber and engaging the discharge valve element as the piston moves out of the cylinder to lift the discharge valve element from its seat whereby fluid will be released from the chamber.

5. A double-acting valve for the control of a flow of fluid to be supplied and discharged from a chamber comprising a first tubular inlet flow conduit for controlling the flow of pressurized fluid to a chamber, a second tubular flow conduit for controlling the flow of pressurized fluid from the chamber to a zone of reduced pressure being positioned coaxial and surrounding said first conduit, a valve seat in said first conduit facing in an upstream direction, a movable valve element seated against the valve seat in said first conduit, an annular end wall in said second flow conduit positioned short of the end of said first flow conduit and having flow orifices therein, a discharge valve element having a tubular collar portion slidably surrounding a portion of the first flow conduit projecting beyond said end wall of the second flow conduit and having an annular flange movable against the end wall to control the flow through said orifices, said discharge valve element including an end wall extending across the end of said collar portion, and a valve control needle projecting into the downstream end of said first flow conduit and adapted to engage the inlet valve element to displace it from its seat with movement in one direction and provided with means to engage said end wall of the discharge valve element with movement in the other direction to move the discharge valve element away from said orifices, movement of said control needle determining whether the inlet valve or the discharge valve is opened.

6. A control valve for controlling the flow of fluid from an inlet area to an intermediate chamber and from the chamber to a discharge area comprising in combination a tubular inlet conduit leading from an inlet area to an intermediate chamber, a valve seat within the inlet flow conduit facing in an upstream direction, a movable valve element seated against said seat, a control needle slidable within the inlet conduit downstream of the valve element and movable toward the inlet valve to engage the valve element to move it off of the seat to permit a flow of fluid, a tubular discharge conduit larger than the inlet conduit and coaxial therewith terminating short of the end of the inlet conduit, a discharge valve including an annular end wall in the discharge conduit having flow orifices therethrough and a movable discharge valve element, said discharge valve element including an annular surface which seats against the end wall to close said orifices and a collar attached thereto slidably surrounding the inlet conduit and having an end wall spaced from the annular surface with an opening for admitting said control needle, means on said control needle for engaging the discharge valve element and moving it away from said orifices when the control needle moves away from the inlet valve element, and a resilient spring having one end connected to said control needle and the other end bearing against the discharge valve element to hold the discharge valve surfaces against said orifices.

References Cited in the file of this patent
UNITED STATES PATENTS

| | | |
|---|---|---|
| 770,128 | Teal | Sept. 13, 1904 |
| 1,457,157 | Galbraith | May 29, 1923 |
| 2,620,182 | Marston et al. | Dec. 2, 1952 |
| 2,621,924 | Panhard | Dec. 16, 1952 |
| 2,622,872 | Wettstein | Dec. 23, 1952 |
| 2,735,132 | Wartian | Feb. 21, 1956 |
| 2,802,664 | Jackson | Aug. 13, 1957 |
| 2,850,276 | Jackson | Sept. 2, 1958 |